S. AMOROSO.
BINDER RING.
APPLICATION FILED MAR. 11, 1916.
1,228,866.
Patented June 5, 1917.
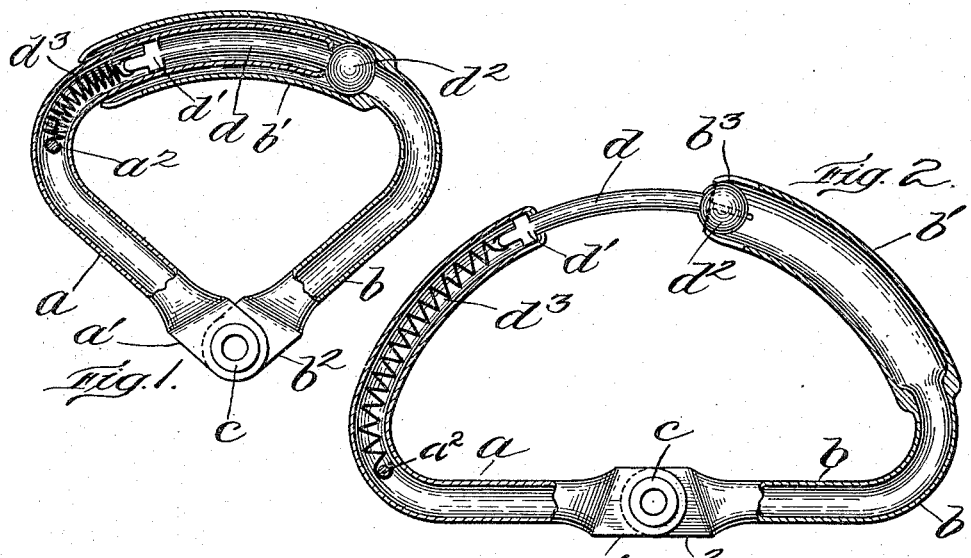
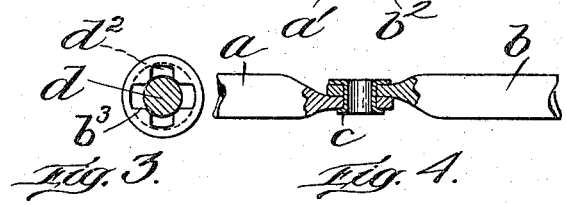
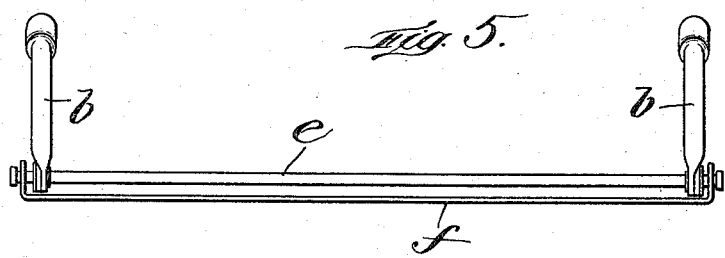
Inventor:
Silvio Amoroso
by
Geo. N. Goddard Atty.

UNITED STATES PATENT OFFICE.

SILVIO AMOROSO, OF BOSTON, MASSACHUSETTS.

BINDER-RING.

1,228,866.  Specification of Letters Patent.  Patented June 5, 191[?]

Application filed March 11, 1916. Serial No. 83,646.

*To all whom it may concern:*

Be it known that I, SILVIO AMOROSO, citizen of the United States, and resident of Boston, Massachusetts, have invented certain new and useful Improvements in Binder-Rings, of which the following is a specification.

This invention relates to book binder devices such as are used in loose leaf books of various kinds and is intended to provide a simple and convenient binder ring of this character so constructed as to reduce to a minimum the wear and strain upon the perforated sheets caused by the opening and closing of the book, while making it possible to readily open the ring for the insertion or removal of any or all of the leaves.

To this end the invention comprises, generally speaking, two hinged or pivotally connected arms combined with an intermediate connecting member having telescopic connection with said arms to bridge over the gap between their free ends and having detachable engagement with one of said arms to permit the ring to be opened. These and other features of the invention will be particularly described in this specification and will be defined in the claims annexed thereto.

In the accompanying drawings I have illustrated a simple and convenient form of device embodying the principles of this invention, in which—

Figure 1 is a side elevation principally in central section showing the ring in closed or contracted position.

Fig. 2 is a similar view showing the ring in extended position.

Fig. 3 is a cross sectional view illustrating the separable ball and socket engagement between the connecting bolt and one of the arms of the ring.

Fig. 4 is a cross section showing the hinged joint between the two arms.

Fig. 5 is a side elevation showing the rings applied to the back-bone or frame of the binder.

For the sake of clearness, the drawings show the device on an enlarged scale. In practice I provide two tubular arms $a$ and $b$ whose adjacent ends are flattened and perforated, as shown at $a'$, $b^2$, to receive a tubular rivet $c$ which forms the hinge or pivot joint permanently connecting the tw[o] arms.

One of the arms is preferably provide[d] with an extension $b'$ of larger internal d[i]ameter for the purpose of receiving tele[-]scopically the free end of the other arm [a] both arms throughout their telescoping po[r]tions having the same curvature to permi[t] free telescopic action.

Inside the arm $a$ is mounted a connectin[g] bolt $d$ provided at its rear end with an en[-]larged head or flange member $d'$, and at it[s] forward end with an enlargement or bal[l] $d^2$. A retractile spring $d^3$ is hooked int[o] the rear end of the bolt member $d$, the othe[r] end of said spring being anchored to a trans[-]verse pin or equivalent holding member $a$[?] fastened in the member $a$ nearer to its pivotal joint.

As shown in Figs. 1 and 2 and 3, the fre[e] end of the enlarged portion $b'$ of the arm $b$ is provided with longitudinal slots $b^3$ to make this end of the tube expansible and contractible, and the extreme edge is bent or turned inwardly so as to form a retaining lip or socket for detachably engaging the ball. This ball-and-socket joint has sufficient resistance to retain the members against disengagement under ordinary conditions of use incident to the opening and closing of the book, while allowing the bolt to be disengaged by the exertion of extra pressure applied either by hand to the ball-and-socket connection or exerted by the bending back of the book leaves until the joint ends of the arms $a$, $b$, pass beyond the position of alinement shown in Fig. 2, or at an angle somewhat greater than 180 degrees.

Any desired number of the rings may be mounted upon the detachable rod $e$ of the binder frame $f$. The contractile spring $d^3$ serves both to retract the bolt $d$ so as to telescope it inside of the arm $a$ when the ball $d^2$ is disengaged from its holding socket so as to keep it out of the way, and also serves when the ball $d^2$ is in holding position within its socket to collapse or contract the free end of the arm $a$ toward the free end of the arm $b$.

It will be seen that owing to the freedom of movement accorded to the arms $a$, $b$, each arm moves readily with the leaves that are rung upon it, thereby avoiding to a considerable extent the sliding of the leaves back and forth on the supporting ring, which tends to wear out the edges of the perforations in the leaves.

What I claim is:

1. A book binder ring embracing in its construction two pivotally connected arms and a bolt for interconnecting their free ends, said bolt having telescopic engagements with each arm and having detachable holding engagement with one of said arms, substantially as described.

2. A book binder ring embracing in its construction two opposed tubular arms, an interconnecting bolt telescopically mounted in one of said arms and having a detachable locking engagement with the free end of the other arm, substantially as described.

3. A book binder ring embracing in its construction two tubular arms, a sliding bolt mounted to telescope in one of said arms, means for normally retracting said bolt within said arm, the outer end of said connecting bolt being constructed to form a detachable interlocking engagement with the free end of the other arm, substantially as described.

4. A book binder ring embracing two arms pivotally connected together at their adjacent ends, their free ends being constructed to telescope one inside the other, and a detachable connecting bolt for connecting the free ends of said arms, substantially as described.

5. A ring embracing in combination two pivotally connected arms, means for detachably connecting their free ends, and means automatically drawing the free ends together, substantially as described.

6. The combination of two pivotally connected tubular arms adapted to telescope one within the other, a bolt for detachably connecting the free ends of said arms, and a spring acting through said bolt to draw the free ends of said arms together, substantially as described.

7. The combination of a pair of curved tubular arms pivotally connected together, a tubular pivot member forming the pivotal joint between said arms, a locking member having ball-and-socket engagement with the free end of one of said arms and having permanent engagement with the other arm, substantially as described.

8. In a loose leaf binder, the combination of a longitudinal rod, a series of binder rings mounted upon said rod and extending transversely thereof, said binder rings embracing two telescoping arms pivotally connected together, and a connecting bolt for detachably connecting the free ends of said arms, substantially as described.

In witness whereof, I have subscribed the above specification.

SILVIO AMOROSO.

Copies of this patent may be obtained for five cents each, by addressing the "Commissioner of Patents, Washington, D. C."